US006175893B1

United States Patent
D'Souza et al.

(10) Patent No.: US 6,175,893 B1
(45) Date of Patent: Jan. 16, 2001

(54) HIGH BANDWIDTH CODE/DATA ACCESS USING SLOW MEMORY

(75) Inventors: Kenneth J. D'Souza, Irvine; Tsun Yau Ng, Orange, both of CA (US)

(73) Assignee: Western Digital Corporation, Irvine, CA (US)

( * ) Notice: Under 35 U.S.C. 154(b), the term of this patent shall be extended for 0 days.

(21) Appl. No.: 09/066,077

(22) Filed: Apr. 24, 1998

(51) Int. Cl.[7] .................................................. G06F 12/06
(52) U.S. Cl. ........................ 711/102; 711/218; 711/167; 711/5
(58) Field of Search ................................ 711/102, 5, 218, 711/103, 167

(56) References Cited

U.S. PATENT DOCUMENTS

| 4,370,729 | * | 1/1983 | Bosch .................................... | 711/218 |
| 5,550,996 | * | 8/1996 | Shiba et al. ........................... | 171/213 |
| 5,594,888 | | 1/1997 | Yamada ................................ | 711/168 |
| 5,594,913 | * | 1/1997 | Ostler et al. .......................... | 711/218 |
| 5,603,001 | * | 2/1997 | Sukegawa et al. ................... | 711/103 |
| 5,710,904 | * | 1/1998 | Masui ........................................ | 711/5 |
| 6,026,465 | * | 2/2000 | Mills et al. ........................... | 711/103 |

OTHER PUBLICATIONS

Anderson, Don, "PCMCIA System Architecture 16–bit PC Cards Second Edition", MindShare, Inc.; Addison–Wesley Publishing Company; Jul. 1995; p. 182.*
Dipert, Brian and Markus Levy, "Designing with Flash Memory", Annabooks; Apr. 1994; pp. 200–204.*

* cited by examiner

Primary Examiner—Reginald G. Bragdon
(74) Attorney, Agent, or Firm—Milad G. Shara

(57) ABSTRACT

A read-only memory is connectable to a microcontroller data bus and address bus and includes memory circuits for storing a sequential array of code words executable by the microcontroller; memory address decoding circuits for selecting one of the array of code words, and circuits for conveying the selected one to the data bus when a read signal is received from the microcontroller. Circuits are provided for storing an address transmitted by the microcontroller when an address latch signal is received from the microcontroller, the stored address being connected to the memory address decoding circuits. The stored address is incremented each time a read signal is asserted. A microcontroller for executing a program stored sequentially in read-only memory comprises an address bus for providing a next program code word address to the read-only memory; circuits for providing an address latch enable signal to the read-only memory for latching the program code word address, and circuits for providing a read signal to the read-only memory. The address latch enable signal is suppressed when the next program code word address is consecutive with an immediately preceding program code word address. The microcontroller does not generate the address of the next program code word as long as the address of the next program code is consecutive with an immediately preceding program code word address. A disk drive controller includes both such microcontroller and a program code memory.

11 Claims, 5 Drawing Sheets

HIGH BANDWIDTH CODE/DATA ACCESS USING SLOW MEMORY

BACKGROUND OF THE INVENTION

1. Field of the Invention

The invention pertains to the field of disk drive controllers. More particularly, the present invention pertains to disk drive microcontrollers, read only program code memory and the interface therebetween.

2. Description of the Related Art

If the speed at which a microcontroller executes program code words is matched by the speed at which the memory storing these program code words is able to provide them, then the microcontroller and code memory are evenly matched. Under such a state, the microcontroller requests a program code word from the code memory by supplying the code memory with the address of the program code word requested. The code memory then decodes the address and supplies the microcontroller with the program code word located at the address supplied by the microcontroller as soon as the microcontroller is able to process it.

However, a problem arises when the microcontroller processes instruction code words faster than the code memory is able to supply them. The speed of the code memory then becomes a bottleneck, limiting the rate at which the microcontroller processes instructions to the rate at which the code memory is able to supply the program code words. Under these circumstances, the microcontroller is forced to wait in an idle state for code words to appear on its data bus from the slower code memory, without executing any instructions. The clock cycles during which the microcontroller waits for the slower code memory to place requested program code words on the data bus are appropriately called wait states.

It has become apparent that the speed of microcontrollers has outpaced the speed of read only memories, the type of memory typically used to store program code words. A number of palliative measures have been adopted to attempt to address this disparity in operating speeds. One such measure is simply to insert a predetermined number of wait states, during which the microcontroller is idle, waiting for a next program code word to be placed on its data bus from the read only memory. This is, however, a less than optimal solution, as microcontroller resources are not efficiently utilized.

Another measure that has been proposed divides the code memory into two banks of memories; namely, one memory bank for storing code words whose addresses are odd and another memory bank for storing code words whose addresses are even. This is commonly called interleaved memory. Using interleaved even and odd memories, Yamada, in U.S. Pat. No. 5,594,888, speeds up read operations of a program stored in a ROM by simultaneously latching an odd byte and the next consecutive even byte (or vice-versa) of a multi-byte instruction word from the odd and even memory banks, respectively, responsive to two read signals. However, such an approach appears limited to retrieving consecutive bytes of a single multi-byte instruction and appears to require the re-generation of a code word address for each new instruction. Moreover, this approach requires complex signaling, additional signal pins on the device and yields only an incremental improvement in microcontroller utilization, and then only for multi-byte instructions. The problem of how to efficiently supply code words from a slow code memory to a relatively faster microcontroller remains unsolved.

What is needed, therefore, is a means for efficiently supplying program code words from a slow code memory to a relatively faster microcontroller. In particular, what is needed is a means for supplying a microcontroller with the requisite program code words from a relatively slower code memory that does not require the microcontroller to generate addresses for linear code.

SUMMARY OF THE INVENTION

It is, therefore, an object of the present invention to provide circuits for efficiently supplying code words from a slow code memory to a relatively faster microcontroller.

It is another object of the present invention to provide circuits for supplying a microcontroller with the requisite program code words from a relatively slower code memory, without requiring the microcontroller to insert one or more wait states.

In accordance with the above objects, a read-only memory according to an embodiment of the present invention is connectable to a microcontroller data bus and address bus, and comprises memory circuits for storing a sequential array of code words executable by the microcontroller; memory address decoding circuits for selecting one code word of the array of code words; circuits for conveying the selected one code word to the data bus when a read signal is received from the microcontroller; circuits for storing an address transmitted on the address bus by the microcontroller when an address latch signal is asserted by the microcontroller, the stored address being connected to the memory address decoding circuits; and circuits for incrementing the stored address each time a read signal is received from the microcontroller.

The read-only memory may further comprise a ready circuit having a ready state and a not-ready state for delaying the microcontroller when the not-ready state is asserted. The not-ready state may be asserted by the ready circuit when a read signal is received immediately after an address is stored. The ready state may be asserted by the ready circuit immediately when a read signal is received subsequent to a read operation from the stored address. The memory circuits may comprise an odd array and an even array. The address storing circuits may comprise odd address storage circuits connected to the odd array and even address storage circuits connected to the even array. The stored address incrementing circuits, according to the present invention, may increment the even address storage circuits when the address transmitted by the microcontroller is odd.

Another embodiment of the present invention is a microcontroller for executing a program stored sequentially in a read-only memory, the microcontroller comprising an address bus for providing a next program code word address to the read-only memory; circuits for providing an address latch enable signal to the read-only memory for latching the program code word address; circuits for providing a read signal to the read-only memory; and circuits for suppressing the address latch enable signal when the next program code word address is consecutive with an immediately preceding program code word address.

A further embodiment of the present invention is a disk drive having a controller, the controller comprising a read only memory and a microcontroller for executing a program stored sequentially in the read-only memory, wherein the microcontroller includes an address bus for providing a next program code word address to the read-only memory, circuits for providing an address latch enable signal to the read-only memory for latching the program code word address, circuits for providing a read signal to the read-only memory, and circuits for suppressing the address latch enable signal when the next program code word address is consecutive with an immediately preceding program code word address; and wherein the read only memory is connected to a microcontroller data bus and to the address bus, the read only memory including memory circuits for storing a sequential array of code words executable by the microcontroller, memory address decoding circuits for selecting one code word of the array of code words, circuits for conveying the selected one code word to the data bus when a read signal is received from the microcontroller, circuits for storing an address transmitted on the address bus by the microcontroller when an address latch enable signal is received from the microcontroller, the stored address being connected to the memory address decoding circuits, and circuits for incrementing the stored address each time a read signal is received from the microcontroller.

The memory circuits may include an even memory array and an odd memory array. The conveying circuits may include a multiplexer for selecting the one code word from outputs of the even and odd memory arrays. The storing circuits may include at least one register. The storing circuits may include at least one counter and the incrementing circuits may be integral with the at least one counter. The address bus and the data bus may be multiplexed.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Figure 1:
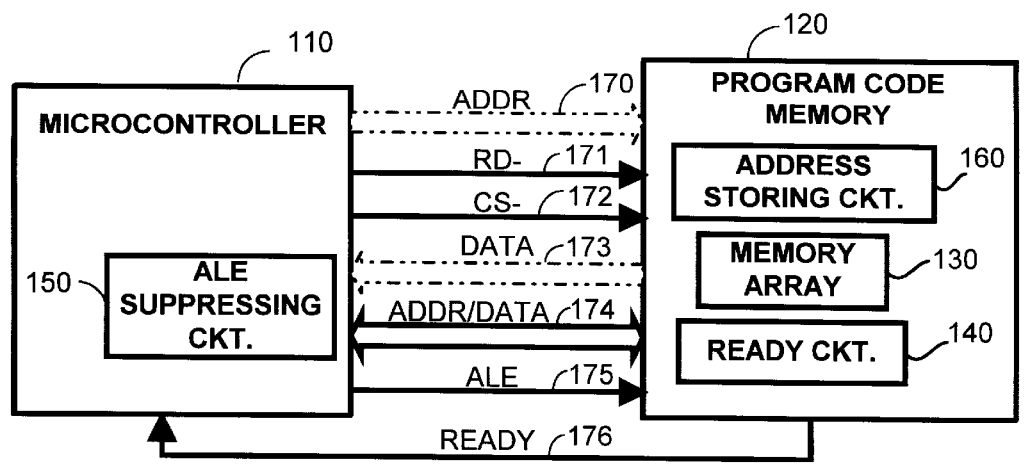
FIG. 1 is a block diagram of a microcontroller and of a program code memory according to one embodiment of the present invention.

Linear code, at least within the context of the present invention, generally refers to code in which consecutively executed instructions are stored at contiguous memory locations. This means that linear code consists of program code words whose addresses are consecutive. Most program code is at least piece-wise linear. Indeed, apart from relatively infrequent instances of non-linear code, the address of the next program code word can be obtained by adding 1 to the address of the preceding program code word. Examples of non-linear code include those instances where a break in the linearity of the code is initiated by a GOTO instruction, a jump instruction, a procedure or function call and the like. In these situations, execution of the program stored within the code memory jumps to another portion of the code.

A typical memory access cycle consists of the microcontroller placing an address on an is address bus, the microcontroller asserting an Address Latch Enable (hereafter ALE) signal, the memory decoding and accessing the word stored at the specified address, and the memory placing the word on a data bus for the microcontroller to retrieve. The present invention, however, exploits the piece-wise linearity of program code described above to achieve significant speed advantages. For linear portions of the program code, the present invention dispenses with the first and second steps; namely, the placement of an address on the address bus by the microcontroller and the assertion of the ALE signal. According to an embodiment of the present invention, the program code memory includes address storing means for storing a program code word address provided on the address bus by the microcontroller when an address latch signal is asserted by the microcontroller. The stored address, in turn, is connected to the memory address decoding circuits. By incrementing the stored address for as long as the program code is linear, the program code memory may self-generate program code word addresses of the next required program code words. Thereafter, program code words corresponding to the self-generated addresses are accessed and placed on a data bus for the microcontroller to retrieve. That is, as long as the ALE signal is not asserted by the microcontroller, the program code memory independently generates the address of the next required program code word, then accesses and places the corresponding program code word on the data bus. In this manner, the microcontroller need not place the address of the next required program code word on the address bus when the address is consecutive with an immediately preceding program code word address, nor need the microcontroller assert the ALE signal. This achieves significant speed advantages because, as long as the address latch signal is not asserted by the microcontroller, the program code memory places a stream of program code words onto the data bus responsive to read commands originating from the microcontroller, without further time consuming input of addresses from the microcontroller or ALE signal assertions.

FIG. 1 shows a conceptual block diagram of a microcontroller 110 according to the present invention, a program code memory 120 according to the present invention, as well as interconnections therebetween. As shown in FIG. 1, the transfer of address and data information between microcontroller 110 and program code memory 120 may be implemented on separate busses such as address bus 170 and data bus 173, shown in dotted line form, or may preferably be implemented as a time multiplexed address/data bus 174. As further shown in FIG. 1, the microcontroller 110 includes an ALE signal suppressing circuit 150. According to the present invention, the ALE suppressing circuit 150 suppresses the ALE signal 175 and preferably internal associated logic states when the next program code word address is consecutive with an immediately preceding program code word address. This means that the microcontroller 110 asserts the ALE signal 175 only when the next required program code word address is not consecutive with the immediately preceding program code word address. An asserted ALE signal 175, therefore, alerts the program code memory 120 that the next required program code word is non-consecutive. This is done by asserting the Chip Select signal 172 (hereafter CS- signal) and by latching the address transmitted on the address bus 170 or the address/data bus 174 by the microcontroller within the address storing circuit 160 in the program code memory 120.

According to the present invention, when the next required program code word is non-consecutive relative to an immediately preceding program code word, the microcontroller 110 asserts the ALE signal 175 and CS- signal 172 and places the next required program code word address onto the address bus 170 or the address/data bus 174. The program code memory 120 then stores the address in the address storing circuit 160. If the read signal 171 (hereafter RD- signal) is asserted, a ready circuit 140 assumes a not-ready state immediately after the program code word address is stored in the address storing circuit 160. The address storing circuit 160, as will be seen in FIG. 3, may be, for example, a register or a counter. This not-ready state causes the ready circuit 140 to de-assert the READY signal 176, thereby delaying the microcontroller 110 while the stored address is stored, and a code word is accessed in the program code memory 120, and placed on the data bus 173 or on the address/data bus 174. As will be seen below, because subsequent consecutively addressed program code words can by accessed using an address from address storing circuit 160, the ready circuit 140 may assert the READY signal 176 immediately when the RD- signal 171 is received after an initial read operation from the stored address.

In an alternate embodiment, ready circuit 140 may be implemented in microcontroller 110, providing for predetermined wait states during memory cycles which access program code memory 120. In this embodiment, Ready signal 176 is not required to be connected between microcontroller 110 and program code memory 120.

According to one embodiment of the present invention, when the next required program code word is consecutive relative to an immediately preceding program code word, the ALE suppressing circuit 150 of the microcontroller 110 suppresses the ALE signal 175 and may preferably bypass internal logic states, such as those generating now unnecessary address bus cycles, prior to asserting the read signal RD- 171. The ALE suppressing circuit 150 may comprise comparator circuits which can determine that an address for a current read operation is consecutive with an immediately preceding address for a read operation. Numerous implementations of the ALE suppressing circuit 150 are possible and would be apparent to one skilled in the art. Preferably ALE suppressing circuit 150 is integral to microcontroller 110, however the invention can still be used to advantage with an embodiment of the ALE suppressing circuit 150, external to microcontroller 110, which can suppress ALE signal 175.

When the ALE signal 175 is suppressed, and the CS- signal 172 and RD- signal 171 are asserted, the address storing circuit 160 of the program code memory 120 increments the address stored therein by 1, thereby generating the next required address for the next required program code word. This incremented address is then decoded by memory array 130, and the corresponding code word is accessed and placed on the data bus 173 or the address/data bus 174 for retrieval by the microcontroller 110. The microcontroller 110 is informed that the next required code word is available on the data bus 173 or the address/data bus 174, as the ready circuit 140 of the program code memory 120 asserts the READY signal 176 as soon as it receives the RD- signal 171 subsequent to the previous read operation from the address stored in the address storing circuit 160.

According to a preferred embodiment of the present invention, the separate address bus 170 and the data bus 173 shown in dashed lines in FIG. 1 may be replaced by the multiplexed address/data bus 174. This embodiment has the advantage, among others, of reducing the number of pins of the pair of devices, by not requiring the separate address and data buses 170 and 173, respectively. In this particular embodiment, the present invention has the advantage of eliminating overhead cycles for switching the bus between address and data modes and therefore dynamically extending the period of time in which the multiplexed address/data bus 174 functions as a data bus. Indeed, it is only when the next required program code word address is non-consecutive with an immediately preceding program code word address that the address/data bus 174 functions as an address bus. At other times, the address/data bus 174 transmits a succession of program code words to the microcontroller 110, without the microcontroller 110 having to generate and place an address on the address/data bus 174 or assert the ALE signal 175.

Figure 2:
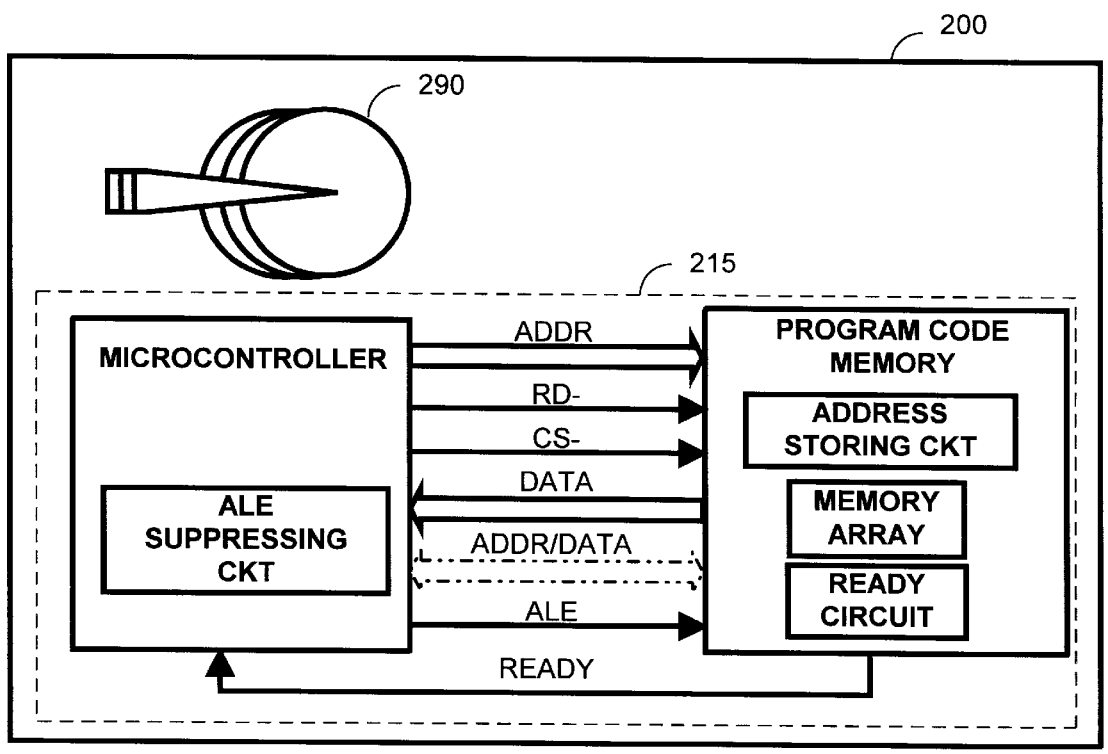
FIG. 2 shows a disk drive according to another embodiment of the present invention.

FIG. 2 shows an embodiment of the present invention in which the structures of FIG. 1 are incorporated into a disk drive controller 215 for controlling a disk drive 200, the storage devices of which being stylistically shown at reference numeral 290. By self-generating addresses of next required consecutive program code words, the program code memory of the disk drive controller 215 improves the performance of a stored control program in the disk drive 200 by eliminating or reducing the number of wait states and overhead cycles encountered during program execution.

Figure 3:
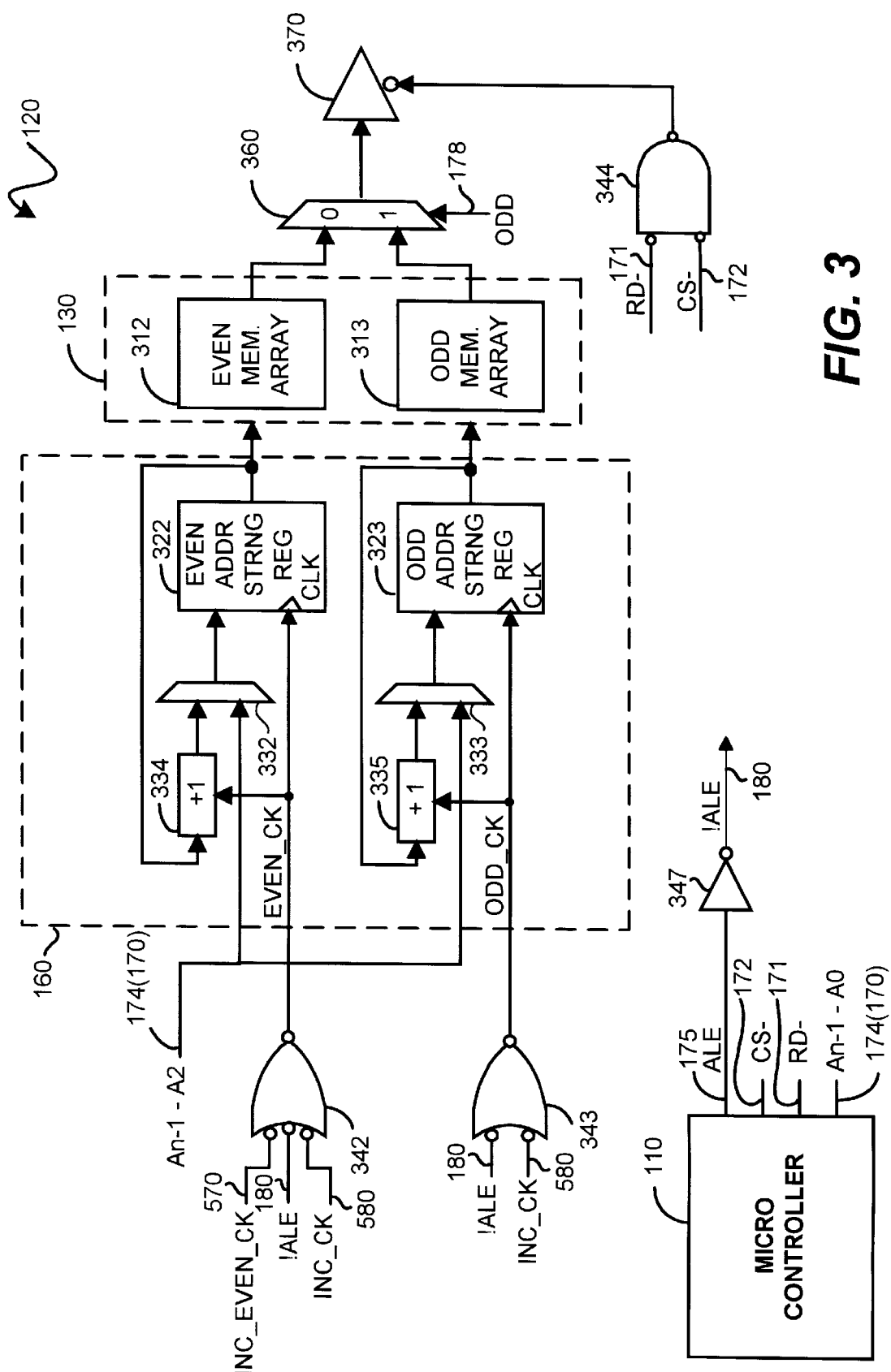
FIG. 3 is a block diagram of an embodiment of the program code memory according to the present invention.

FIG. 3 shows a more detailed functional block diagram of an embodiment of the present invention. Memory array 130 comprises even memory array 312 and odd memory array 313. Even memory array 312 further comprises address decoding means and stores program code words which are addressed on an even address boundary. Odd memory array 313 likewise comprises address decoding means but stores program code words addressed on an odd address boundary. The width in data bits of each memory array 312, 313 is preferably defined by the width of data bus 173 or address/data bus 170. The odd and even address boundary is then determined by the granularity of memory access which is defined by the bus width. For example, for an address bus having n address bits $A_{n-1}$–$A_0$ where $A_{n-1}$ is the most significant address bit and $A_0$ is least significant, and if data bus 173 or address/data bus 174 in data mode is eight bits wide, the $A_0$ bit would distinguish between odd and even code words. Preferably data bus 173 or 174 is 16 or 32 bits wide and the distinction between odd and even code words is based on an $A_1$ or $A_2$ address bit respectively. In FIG. 3, microcontroller 110 provides address bits $A_n$–$A_0$ on address bus 174 or 170 and memory array 130 is addressed by address bits $A_n$–$A_2$ in a 16 bit wide implementation.

Address storing circuit 160 comprises even address storage register 322 and odd address storage register 323. An even multiplexer 332 is connected to the inputs of even address register 322 while an odd multiplexer 333 is connected to the inputs of odd address register 323. Address incrementing logic circuits 334 and 335 are connected to one input each of multiplexers 332 and 333 respectively. Address bits $A_{n-1}$–$A_2$ from address bus 174 or 170 are connected to a second input of each multiplexer 332, 333. When ALE signal 175 is asserted by microcontroller 110, address bits $A_{n-1}$–$A_2$ are selected to be output by each multiplexer 332, 333 and inverted ALE 175 signal ALE provides a clocking signal to each address register 322, 323 via the AND gates 342, 343 which provide an OR function of negatively asserted signals. Thus both address registers 322, 323 store the address presented by microcontroller 110 on address/data bus 174 or address bus 170 when ALE 175 is asserted. ALE 175 is inverted by inverter 347 to produce !ALE 180, used by circuitry described below.

A special condition applies when the address provided by microcontroller 110 is odd relative to the even and odd boundaries discussed above. In this case, the code word in the even memory array 312 would not be addressed by the address stored during the assertion of ALE 175. The program code memory 120 in this case advances the address stored in even address storing register 322 by providing the INC_EVEN_CK 570 signal to AND gate 342 which initiates an incrementing cycle by clocking the stored address plus one into even address storing register 322 via incrementing logic 334 and multiplexer 332.

Thereafter, for each subsequent assertion of RD- 171, the address stored in even and odd address storing registers 322, 323 is clocked by INC_CK signal 580 provided to AND gates 342 and 343. The circuitry for generating the signals INC_CK 580 and INC_EVEN_CK 570 will be described later. Further during the assertion of RD- 171, logic in address incrementing circuits 334 and 335 determines whether the address to be clocked into address storing registers 322 and 323 is the stored address (no increment) or the stored address +1 (incremented). Logic operation of address incrementing circuits 334 and 335 is described in Table 1 below in the form of programmable logic statements.

on data bus 173 or multiplexed address/data bus 174. ODD 178 also enables the logic of Table 1 to provide the appropriate incrementing of address storage registers 322 and 323.

Continuing in FIG. 3, the stored address is provided to even memory array 312 and odd memory array 313 of memory array 130. Multiplexer 360 receives program code words from each array as inputs. The appropriate odd or even code word is selected to be output by multiplexer 360 to tri-state bus driver 370 by ODD signal 178 connected to multiplexer 360. The ODD signal 178 is derived from the address bit which is next lower in significance to the lowest address bit provided to memory array 130 as described above. A negative AND RD-.CS- signal provided by OR gate 344 enables tri-state driver 370 to present the selected program code word to microcontroller 110 on address/data bus 174 or data bus 173.

Figure 4:
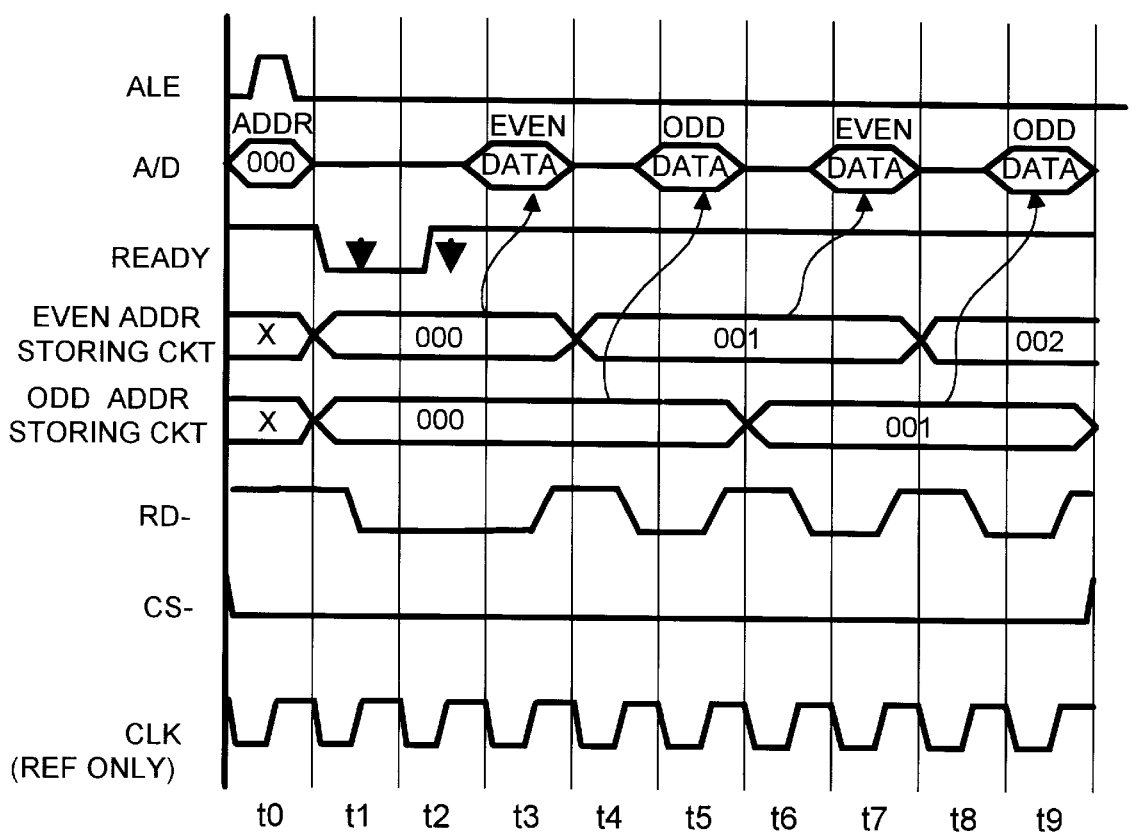
FIG. 4 is a timing diagram illustrating the operation of the microcontroller and of the program code memory according to the present invention.

FIG. 4 is a timing diagram illustrating an operation of the circuit of FIG. 3. During the time interval t0, the ALE signal is asserted, indicating that the next required program code word is stored at an address that is not consecutive with the immediately preceding address. During the remainder of the time periods shown in FIG. 4, the ALE signal is suppressed,

TABLE 1

| Circuit | Logic Description |
|---|---|
| 334 | //Even address storing operation<br>always @ (posedge EVEN_CK)<br>    if(MISS) EVEN_CNT <= ADDR<br>    else begin<br>    if(INC_EVEN_EN\|! ODD) EVEN_CNT <=EVEN_CNT + 1<br>    else EVEN_CNT <=EVEN_CNT<br>    end |
| 335 | //Odd address storing operation<br>always @ (posedge ODD_CK)<br>    if(MISS) EVEN_CNT <= ADDR<br>    else begin<br>    if(ODD)ODD_CNT <=ODD_CNT + 1<br>    else ODD_CNT <=ODD_CNT<br>    end |

Figure 5:
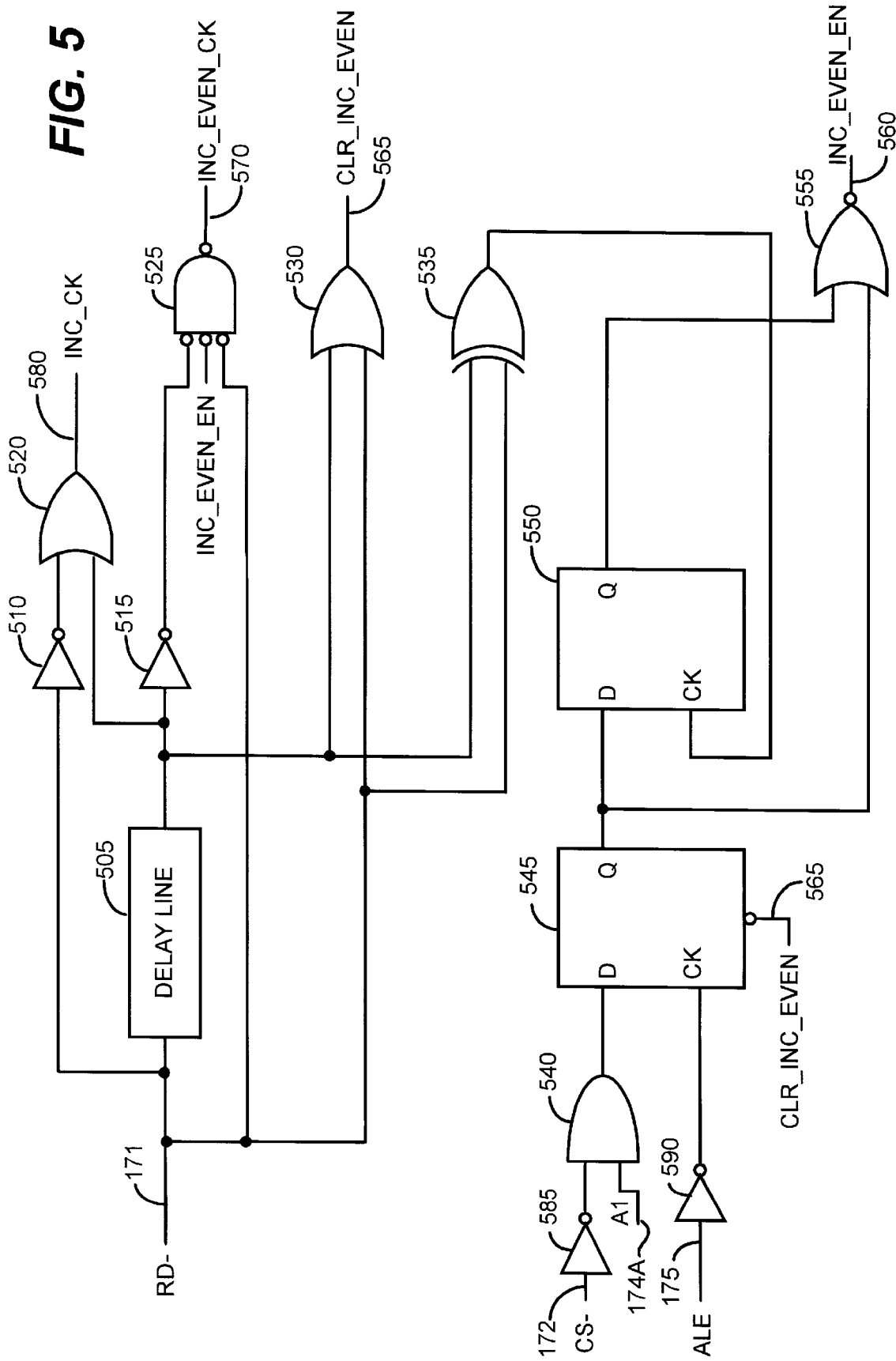
FIG. 5 shows a circuit to generate signals to clock the even and odd address storing registers shown in FIG. 3.
Figure 6:
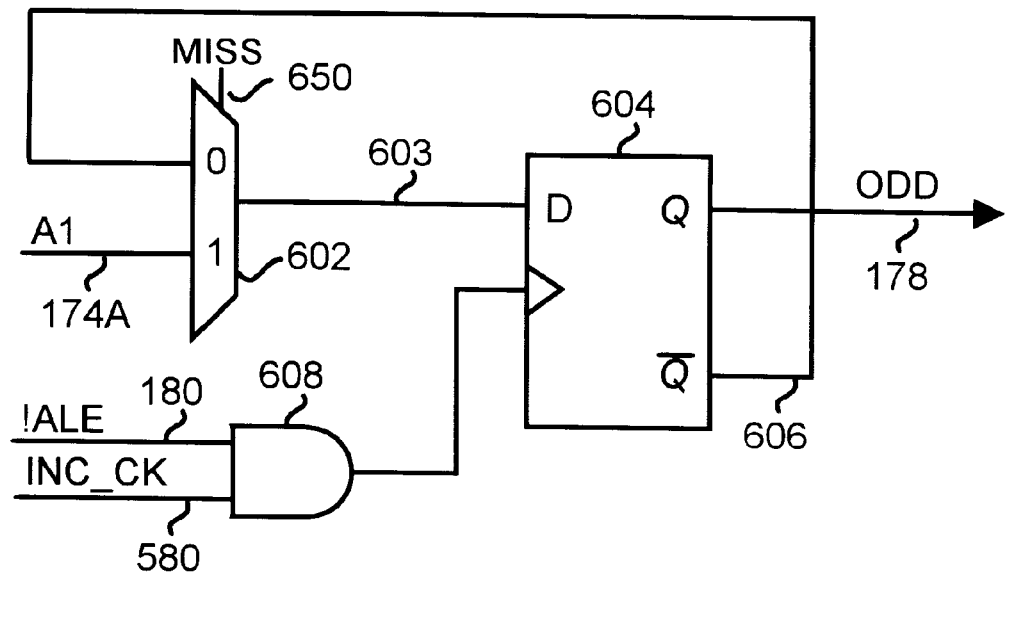
FIG. 6 shows circuits to generate the Miss and Odd signals used respectively in the program code memory to initiate loading a new address into the address storage registers and to select between odd and even memory arrays.
Figure 6:
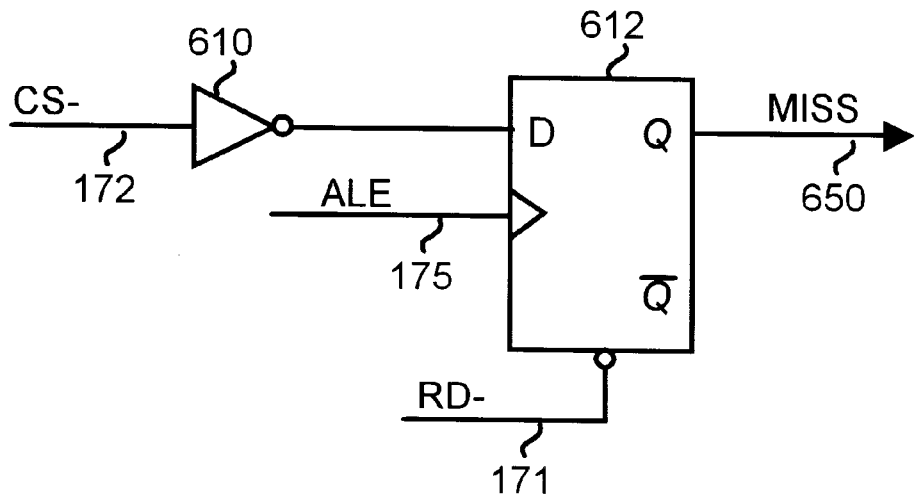

FIG. 6 shows the generation of logic terms MISS 650 and ODD 178 used in Table 1. MISS 650 is set true in flip-flop 612 when ALE 175 is asserted during a valid CS- 172. CS- 172 is inverted by inverter 610 to qualify the D input of flip-flop 612. MISS 650, as shown in Table 1, causes the address presented by microcontroller 110 with ALE 175 to be stored in even and odd address storage registers 322, 323. Flip-flop 612 is reset when signal RD- 171 is received from microcontroller 110 de-asserting MISS 650 until a subsequent assertion of ALE 175. ODD 178 is initialized in flip-flop 604 during the presentation of an address by microcontroller 110 to program code memory 120. !ALE 180 is asserted, clocking flip-flop 604 which samples the output 603 of multiplexer 602. MISS 650 enables the 1 input of multiplexer 602 which is connected to the A1 address bit 174A of address bus 174 (or 170). Flip-flop 604 thus latches the state of address bit A1 when ALE 175 is asserted. The selection of which address bit to latch to initialize the ODD 178 term is, as discussed above, dependent on the width of memory arrays 312, 313. Thereafter, flip-flop 604 is toggled at each INC_CK 580 pulse by feeding back flip-flop 604 not Q output 606 to its D input through multiplexer 602. The generation of INC_CK 580 is discussed in the description of FIG. 5 below. The toggling is enabled because MISS 650 is false during subsequent read cycles when ALE 175 is de-asserted. The toggling of ODD 178 enables alternate odd and even memory words to be output to microcontroller 110 meaning that it is pulled low or de-asserted. This non-consecutive address is put on the A/D bus 174 and may be an even or an odd address. In the example shown in FIG. 4 at time t0, this next required address transmitted on the A/D bus 174 is an even address. The address storing registers 322, 323 must, therefore, be reloaded with this address from the A/D bus 174. The READY signal is pulled low or de-asserted, beginning at time t1, indicating a not ready state, when the RD- signal is received by the program code memory to delay the microcontroller 110 while the address storing registers 322, 323 are loaded and while the corresponding program code words are made available. The microcontroller 110 of FIG. 1, as shown in FIG. 4, is delayed for a period of time to allow the next required code word to become available, as indicated by the arrows shown on the READY line during time t1 and a portion of t2. Beginning during time t2, the READY signal is asserted, the read signal RD- is asserted, and the program code word corresponding to the even address that was placed, during time t0, on the A/D bus 174 (then functioning as an address bus), may be gated onto the A/D bus 174 (now functioning as a data bus). This is indicated by the (even) DATA legend on the A/D line during time t3. The curved arrows indicate the correspondence between the addresses stored within the even and odd address storing registers 322 and 323 respectively, and the program code words placed on the A/D bus 174. Then, the address stored within the even address storing register 322 is the incremented, at time t4, so as to allow the even memory array 312 to pre-access the next consecutive program code word having an even address. The odd address storing register 323, beginning at time t1, stores the next required odd program code address. This next required odd program code address has been provided to the odd memory array 313, and the corresponding program code word is now ready to be output onto the A/D bus 174. Beginning during time t4, the RD- signal is again asserted, and the next required odd program code word is output onto the A/D bus 174, still functioning as a data bus. The address stored within the odd storing register 323 is immediately incremented after the read operation, at time t6, to allow pre-access of the next required odd program code word. This code word is output onto the A/ID bus 174 as follows. As the CS- signal remains asserted at time t5, and as the address of the next program code word is odd, the multiplexer 360 shown in FIG. 3 will select the output of the odd memory array 313 as the one to be output through the tri-state buffer 370 onto the A/D bus 174.

As the even address of the next required program code word is already present in the even storing register 322 and has since been transmitted to the even memory array 312, the next required even program code word may be output onto the A/D bus 174 immediately beginning during time t6. It should be noted that the address stored within the even storing register 322 has already been incremented, at time t4, after the previous read operation at time t4. As before, the address stored within the even storing register 322 is incremented after the read operation, at time t8. The next required program code word stored at an odd address may then be output onto the A/D bus 174, beginning during time t8. Indeed, this code word has already been pre-accessed, and may be output onto the A/D bus 174 by being selected by the multiplexer 360, as long as the tri-state buffer 370 controlled by the CS- signal is in a low impedance state.

In this manner, the program code memory 120 and the microcontroller 110 according to the present invention cooperate to self-generate program code word addresses as long as the ALE signal is suppressed. That is, the self generation of program code word addresses by the program code memory 120 continues as long as the address of the next required program code word is consecutive with the address of the immediately preceding program code word. Therefore, for those instances where the program code memory 120 self-generates the address of the next required program code word, the microcontroller 110 need not generate it and place it on the bus, nor need it assert the ALE signal. This results in significant time savings, as the program code memory may transmit a sequence of program code words onto the address or address/data bus 174 as long as the program code is linear, without any further input of addresses from the microcontroller 110. Moreover, a slow memory, by using the address pre-generation and accessing scheme described herein, will be able to keep pace with a relatively faster microcontroller. Faster disk drives may be designed utilizing the principles and the circuits shown in FIGS. 1–3, as the disk drive microcontrollers need only control the ALE signal to allow the program code memory to self-generate next required addresses in linear portions of the program code and pre-access the corresponding program code words.

It is important to note that the memory circuit shown in FIGS. 1, 2 and 3 need not comprise even and odd memory arrays, as shown in FIG. 3. Indeed, a monolithic memory, i.e., one not divided into even and odd arrays, may also benefit from the present invention. Indeed, such a monolithic memory may be adapted to self-generate consecutive program code word addresses and still alleviate the microcontroller 10 from the requirement of placing an address on the address bus or address/data bus 174 each time a new program code word is required on the data bus. Moreover, while the circuits shown in FIG. 3 are well adapted to a multiplexed address/data bus, it is to be understood that separate address and data buses may advantageously be utilized, without decreasing the functionality of the present invention or forgoing the advantages to be derived therefrom.

The present invention may be implemented with or without a clock signal for state machine control. That is, the present invention may be implemented as a synchronous or asynchronous system. When no clock signal is used for logic and state machine control, delay lines and other known methods are used to generate the control signals, as shown in FIG. 5. Alternatively, the microcontroller's clock may be utilized to insure proper timing.

Turning to FIG. 5, circuitry for generating internal clock signals to load and increment addresses within program code memory 120 is shown. The circuitry shown at the lower half of FIG. 5 produces a signal INC_EVEN_EN 560 which enables the pre-incrementing of address storing register 322 when an odd address is presented with the assertion of ALE 175 as discussed above. The sequence starts at the trailing edge of ALE 175 by clocking flip-flop 545 set when an odd address enables its D input via the A1 174A input (indicating an odd address in this embodiment as discussed above) to AND gate 540 and inverted CS- 172 via inverter 585. Flip-flop 545 Q output enables the assertion of the low true INC_EVEN_EN term at NOR gate 555 which is provided to OR gate 525, functioning as a negative AND. At the leading edge of low true RD- 171, a pulse is generated by XOR gate 535 to clock flip-flop 550 which extends the INC_EVEN_EN signal from NOR gate 555 after flip-flop 545 is reset by the CLR_INC_EVEN 565 pulse from OR gate 530. At this time, all inputs to OR gate 525 are low because RD- 171 is low, INC_EVEN_EN is low, and the inverted delayed RD- signal from delay line 505 and inverter 515 is low for the period of the delay line 505. Thus a pulse is produced on the INC_EVEN_CK line 570 to increment the stored even address in address storing register 322. At the trailing edge of the RD- 171 signal, flip-flop 550 is clocked reset by a pulse from XOR gate 535.

At the trailing edge of RD- 171, the INC_CK 580 pulse is produced by OR gate 520 from the inverted RD- signal from inverter 510 and the output of delay line 50. INC_CK 580 is provided to clock both odd and even address storing registers 322, 323 via AND gates 342 and 343.

While the foregoing detailed description has described preferred embodiments of the present invention, it is to be understood that the above description is illustrative only and not limiting of the disclosed invention. For example, while the even and odd address storing registers 322, 323 may comprise registers, they may alternatively include counters. If the even and odd address storing registers include counters, the multiplexers 332 and 333 may be internally implemented in the counter and stored address incrementing logic circuits 334 and 335 would be correspondingly modified. The incrementing of the even and odd addresses stored therein would then be made within the counter or counters by counter increment signals. Also, while FIG. 3 illustrates an embodiment utilizing two-way interleaving of the program code memory into even and odd memory arrays 312 and 313, respectively, four-way or higher order interleaving is also possible, with appropriate modifications. Such modifications are believed to be well within the purview of those of skill in this art and are all deemed to fall within the scope of the present invention. Moreover, although the present invention has been described in terms of program code memory, the present invention is also readily applicable to other memories. Further modifications will undoubtedly occur to those of skill in this art, and all such modifications are deemed to fall within the scope of the present invention. Thus, the present invention is to be limited only by the claims as set forth below.

We claim:

1. A read-only memory connectable to a microcontroller data bus and address bus wherein the read-only memory comprises:

memory circuits for storing a sequential array of code words executable by the microcontroller;

memory address decoding circuits for selecting one code word of the array of code words;

means for conveying the selected code word to the data bus when a read signal is received from the microcontroller;

means for storing an address transmitted on the address bus by the microcontroller when an address latch signal is asserted by the microcontroller, the stored address being connected to the memory address decoding circuits;

means for incrementing the stored address each time a read signal is received from the microcontroller and a ready circuit having a ready state and a not-ready state for delaying the microcontroller when the not-ready state is asserted, wherein the not-ready state is asserted by the ready circuit when the read signal is received immediately after an address is stored in the storing means and wherein the ready state is asserted by the reads circuit when a read signal is received subsequent to an internal access from the stored address.

2. The read-only memory of claim 1, wherein the memory circuits comprise an odd memory array and an even memory array.

3. The read-only memory of claim 2, wherein the address storing means comprises an odd address storage means connected to the odd memory array and an even address storage means connected to the even memory array.

4. The read only memory of claim 3, wherein the stored address incrementing means increments the even address storage means when the address transmitted by the microcontroller is odd.

5. A microcontroller for executing a program stored sequentially in a read-only memory, comprising:

an address bus for providing a next program code word address to the read-only memory and for outputting a code word corresponding to the next program word address from the read-only memory;

means for providing an address latch enable signal to the read-only memory for latching the program code word address;

means for providing a read signal to the read-only memory; and means for suppressing the address latch enable signal when the next program code word address is consecutive with an immediately preceding program code word address; and a ready circuit having a ready state and a not-ready state for delaying the microcontroller when the not-ready state is asserted, wherein the not-ready state is asserted by the ready circuit when the read signal is received immediately after the program code word address is latched and wherein the ready state is asserted by the ready circuit when a read signal is received subsequent to an internal access from the latched address.

6. A disk drive having a controller, the controller comprising a read only memory and a microcontroller for executing a program stored sequentially in the read-only memory, wherein:

the microcontroller includes an address bus for providing a next program code word address to the read-only memory, means for providing an address latch enable signal to the read-only memory for latching the program code word address, means for providing a read signal to the read-only memory, and means for suppressing the address latch enable signal when the next program code word address is consecutive with an immediately preceding program code word address; wherein the read-only memory is connected to a microcontroller data bus and to the address bus, the read only memory including memory circuits for storing a sequential array of code words executable by the microcontroller, memory address decoding circuits for selecting one code word of the array of code words, means for conveying the selected one code word to the data bus when a read signal is received from the microcontroller, means for storing at least one address transmitted on the address bus by the microcontroller when the address latch enable signal is received from the microcontroller, the at least one stored address being connected to the memory address decoding circuits, and means for incrementing the at least one stored address each time a read signal is received from the microcontroller, and wherein one of the microcontroller and the read-only memory includes a ready circuit having a ready state and a not-ready state for delaying the microcontroller when the not-ready state is asserted, wherein the not-ready state is asserted by the ready circuit when the read signal is received immediately after an address is stored in the storing means and wherein the ready state is asserted by the ready circuit when a read signal is received subsequent to an internal access from the stored address.

7. The disk drive of claim 6, wherein the memory circuits include an even memory array and an odd memory array.

8. The disk drive of claim 7, wherein the conveying means includes a multiplexer for selecting the one code word from outputs of the even and odd memory arrays.

9. The disk drive of claim 6, wherein the storing means includes at least one register.

10. The disk drive of claim 6, wherein the storing means includes at least one counter and wherein the incrementing means is integral with the at least one counter.

11. The disk drive of claim 6, wherein the address bus and the data bus are multiplexed.

* * * * *